United States Patent [19]

Suzuki et al.

[11] Patent Number: 4,922,351

[45] Date of Patent: May 1, 1990

[54] OPTICAL INFORMATION RECORDING AND REPRODUCING APPARATUS

[75] Inventors: Kenichi Suzuki, Yokohama; Satoshi Shikichi; Fumiaki Kawaguchi, both of Tokyo; Masayuki Usui, Yokohama; Hiroshi Matsuoka, Kawasaki; Kazuhiko Matsuoka; Hideki Hosoya, both of Yokohama; Akio Aoki, Tokyo; Masahiko Enari; Kazuo Minoura, both of Yokohama, all of Japan

[73] Assignee: Canon Kabushiki Kaisha, Tokyo, Japan

[21] Appl. No.: 213,516

[22] Filed: Jun. 28, 1988

Related U.S. Application Data

[63] Continuation of Ser. No. 139,139, Dec. 23, 1987, abandoned, which is a continuation of Ser. No. 814,774, Dec. 30, 1985, abandoned.

[30] Foreign Application Priority Data

Dec. 31, 1984 [JP] Japan .................. 59-28144
Jan. 17, 1985 [JP] Japan .................. 60-006282

[51] Int. Cl.⁵ .......................................... H04M 1/04
[52] U.S. Cl. ................................. 358/494; 358/480; 358/475
[58] Field of Search ............... 358/288, 293, 302, 285, 358/475, 480, 476, 486, 494, 474; 369/44, 38, 47; 235/454, 455, 456, 494

[56] References Cited

U.S. PATENT DOCUMENTS

| | | | |
|---|---|---|---|
| 3,044,768 | 7/1962 | Hoer | 358/288 X |
| 3,689,932 | 9/1972 | Gerber | 358/302 |
| 3,706,860 | 12/1972 | Burbank | 355/53 |
| 3,797,935 | 3/1974 | Marcy | 355/53 |
| 3,919,697 | 11/1975 | Walker | 365/244 |
| 4,393,411 | 7/1983 | Amtower | 358/302 |
| 4,432,023 | 2/1984 | Mehalek | 358/298 X |
| 4,672,182 | 6/1987 | Hirokawa | 335/454 |

FOREIGN PATENT DOCUMENTS

| | | |
|---|---|---|
| 2221914 | 11/1972 | Fed. Rep. of Germany . |
| 0105767 | 6/1985 | Japan .................. 358/302 |
| 912328 | 12/1962 | United Kingdom . |
| 1602212 | 11/1981 | United Kingdom . |
| 8501818 | 4/1985 | World Int. Prop. O. . |

OTHER PUBLICATIONS

Drexon Laser Memory Card, Quarterly Report, No. 7, pp. 1-19 (1984).
Drexon Laser Memory Card, Quarterly Report, No. 8, pp. 1-16 (1984).
Drexon Laser Memory Card, Quarterly Report, No. 1, pp. 1-28 (1984).
Drexon Laser Memory Card, Quarterly Report, No. 2, pp. 1-25 (1984).
Drexon Laser Memory Card, Quarterly Report, No. 3, pp. 1-30 (1984).
Drexon Laser Memory Card, Quarterly Report, No. 4, pp. 1-37 (1984).

*Primary Examiner*—Edward L. Coles, Sr.
*Attorney, Agent, or Firm*—Fitzpatrick, Cella, Harper & Scinto

[57] ABSTRACT

An optical information recording and reproducing apparatus comprises, an optical head for recording and reproducing information on and from a card-shaped optical recording medium, first means for relatively reciprocally moving said optical head to said card-shaped optical recording medium, and control means for controlling a relative speed between said optical head and said optical recording medium, said control means keeping a constant relative speed between said optical head and said optical recording medium in a record area of said optical recording medium and changing the relative speed between said optical head and said optical recording medium and reversing the direction of the relative movement between said optical head and said optical recording medium in areas outside of the record area.

29 Claims, 5 Drawing Sheets

OPTICAL INFORMATION RECORDING AND REPRODUCING APPARATUS

This application is a division, of application Ser. No. 139,139 filed Dec. 23, 1987, now abandoned, which was a continuation of application Ser. No. 814,774 filed Dec. 30, 1985, now abandoned.

BACKGROUND OF THE INVENTION

The present invention relates to an optical information recording and reproducing apparatus which records or reproduces information though relative reciprocal movement of an information recording medium and an optical head which irradiates a light beam to the medium. In the present specification, the term information recording and reproducing apparatus includes apparatus which enable only reproduction of information, only recording of information and both recording and reproduction of information.

Prior art apparatus which record and reproduce information by using a light beam include an optical disk which is a rotating disk-shaped recording medium, an optical card which is a reciprocally moved card-shaped recording medium and an optical tape. Those apparatus have their own characteristics and are selectively used in accordance with purposes and applications. Among others, the optical card has a wide application because of the characteristics of ease of manufacture, portability and accessability.

There are various ways to scan the optical card by a light beam. A system in which an irradiation position of the light beam is relatively linearly scanned to the medium reciprocally while the beam irradiation position is relatively moved transversely to the direction of the reciprocal movement has a characteristic that a mechanism is simple and an effective space on the medium is large. A conceptual view thereof is shown in FIG. 1, in which numeral 1 denotes an optical card on which information is to be recorded, numeral 1', shown by a hatched area, denotes a record area, numeral 2 denotes lines of recorded information, numeral 3 denotes an optical head of a recording and reproducing apparatus, numeral 4 denotes a light beam emitted from the optical head 3 and irradiated to the optical card 2, an arrow A indicates a direction of relative reciprocal movement of the light beam 4 or the optical head 3 to the optical head 1, and an arrow B indicates a direction which is transverse to the direction of the reciprocal movement.

In the optical information recording and reproducing apparatus which uses the optical card, it is desirable that the number of information bits recorded or reproduced in a unit of time, that is, a transfer rate is large or high. In order to increase the transfer rate, however, it is necessary that the reciprocation speed in the direction A is high. On the other hand, it is desirable that the speed of movement in the direction A is essentially constant during recording or reproduction, because, if the speed of movement changes, the magnitudes of the recording bits may differ even if the light beam is turned on and off at a constant frequency and a complex processing is required to resolve a problem caused thereby.

In the apparatus which records or reproduces the information by relatively reciprocally moving the optical head or the optical card, either the optical head or the optical card is actually reciprocally moved. Since either of them has a mass, a rise-up time is required before the speed reaches a predetermined level after reversal, and a full-down time is required before it stops from the moving state at the constant speed. The processing is complex when the information is to be recorded or reproduced under a non-constant speed.

SUMMARY OF THE INVENTION

It is an object of the present invention to provide an optical information recording and reproducing apparatus which can easily record and reproduce information even at a high transfer rate and can effectively utilize a record area of an optical card.

It is another object of the present invention to provide an optical information recording and reproducing apparatus which can use a sufficient length of track for recording information and can effectively utilize a record area on an optical card.

In the optical information recording and reproducing apparatus of the present invention, the above objects are achieved by keeping a constant relative speed between the optical card and the optical head while an essential record area (hereinafter simply referred to as a record area) of the optical card, that is, the area in which information is to be recorded is scanned by a light beam emitted from the optical head and reversing the movement of the optical card or the optical head beyond the record area of the optical card. The record area of the optical card means a data area of the optical card on which data can be recorded, and the reversal of the movement means a series of operations including speed-down of the optical head or the optical card which has been being moved at a constant speed, the movement of the optical head or the optical card in the reverse direction after the stop and the movement at the constant speed.

DESCRIPTION OF THE PREFERRED EMBODIMENTS

Figure 1:
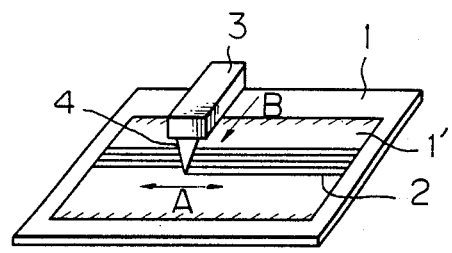
FIG. 1 shows a reciprocal drive system.
Figure 2:
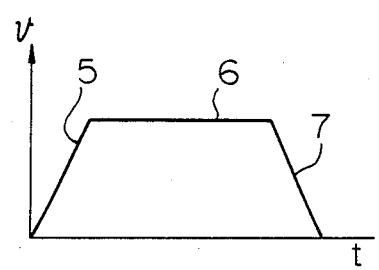
FIG. 2 shows one embodiment of relative movement of an optical head and an optical card by the reciprocal drive system.

Prior to the explanation of the present apparatus, one example for relatively and reciprocally moving the optical card and the optical head is explained with reference to FIG. 2, in which an ordinate represents a relative speed V between the optical card and the optical head and an abscissa represents a time t. A section 5 stows a rise-up portion of the speed from a stop state, a section 6 shows a constant relative speed portion, and a section 7 shows a deceleration portion to stop the movement. In the present invention, the record area is scanned by the light beam in the section 6, and the sections 5 and 7 are carried out externally of the record area.

Figure 3:
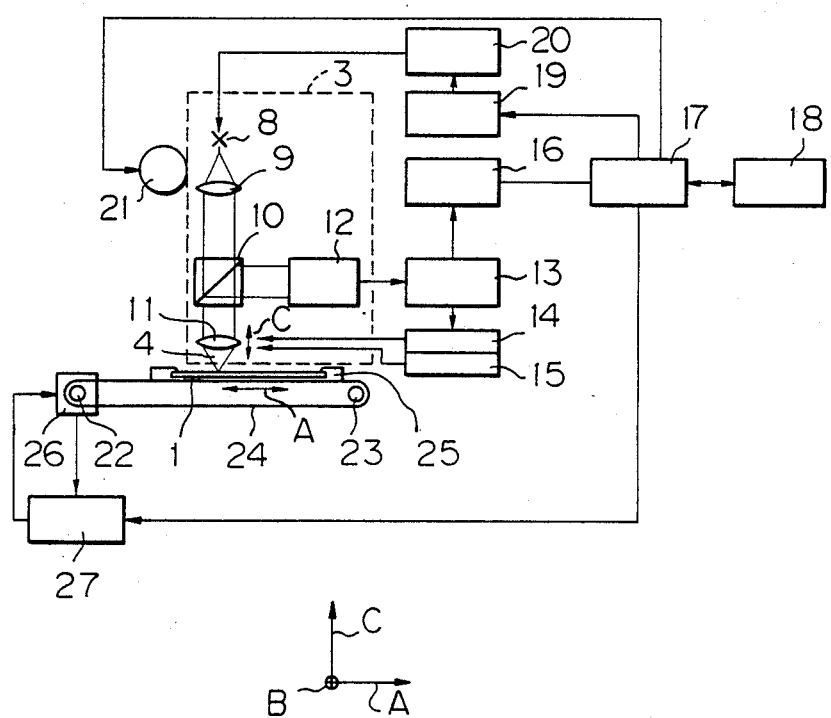
FIG. 3 shows an embodiment of an optical information recording and reproducing apparatus according to the present invention.

FIG. 3 shows one embodiment of the optical information recording and reproducing apparatus of the present invention. Numeral 1 denotes an optical card, and numeral 3 denotes an optical head of the apparatus. The optical head 3 comprises a light source 8 such as a semiconductor laser or an LED, a collimater lens 9 which collimates a light beam emitted from the light source 8, a half-mirror prism 10, an object lens which focuses the collimated light beam onto the optical card 1, and a sensor 12 which senses the light beam reflected by the prism 10. In order to effectively utilize the light beam, the half-mirror prism 10 may be substituted by a polarization beam splitter 10 and a quarter wavelength plate may be inserted between the polarization beam splitter 10 and the object lens 4.

Numeral 13 denotes a pre-amplifier, numeral 14 denotes an auto-focusing servo, numeral 15 denotes an auto-tracking servo, numeral 16 denotes a decoder, numeral 17 denotes an interface, numeral 18 denotes a computer, numeral 19 denotes an encoder, numeral 20 denotes a laser driver, numeral 21 denotes a stepping motor which drives the optical head 3 enclosed by broken lines normally (in the direction B) to the planer of the drawing (transversely to the track), numerals 22 and 23 denote pulleys, and numeral 24 denotes belts reeves on the pulleys 22 and 23. A mount 25 on which the optical card 1 is mounted and fixed thereby is attached to the belt 24. The pulley 22 is attached to a shaft of the motor 26, and the optical card 1 is reciprocally moved in the direction A as the motor 26 is rotated. Numeral 27 denotes a motor servo which controls the rotation of the motor 26.

The operation of the apparatus shown in FIG. 3 is now explained. The reproduction operation is first described. The light beam emitted from the laser 8 is collimated by the lens 9, passes through the beam splitter 10 and is focused by the object lens to form a fine spot on the optical card 1. The reflection light from the optical card 1 is modulated depending on whether an information bit is present at the area irradiated by the fine spot. The light beam reflected by the optical card is collimated by the object lens 11 and applied to the sensor 12 by the beam splitter 10. The sensor 12 detects a light intensity of the modulated light team and converts it to an electrical signal, which is supplied to the preamplifier 13. A signal is sent from the preamplifier 13 to the auto-focusing servo 14, and the lens 11 is driven along the optical axis (direction C) by an actuator (not shown) by a signal from the auto-focusing servo 14 to control a distance between the lens 11 and the optical card 1 so that the beam 4 is focused on the optical card 1. The signal from the pre-amplifier 13 is also sent to the auto-tracking servo 15, and a signal from the auto tracking servo 15 drives the lens 11 normally to the plane of the drawing by an actuator (not shown) so that the light beam is focused at a predetermined position.

The auto-focusing servo and the auto-tracking servo have been known in the art and they may be applicable to the present apparatus. Therefore, the explanation thereof is omitted here.

The signal from the preamplifier 13 is also supplied to the decoder 16 and a decoded signal is supplied to the interface 17. The interface 17 sends an information signal to the computer 18. The interface 17 also sends a signal to the encoder 19 where it is modulated and the modulated signal is supplied to the laser driver 20 which controls the oscillation of the laser 8. The interface 17 also sends a signal to the pulse motor 21 to control the position of the optical head 1 in the normal direction to the plane of the drawing. The interface 17 further sends a signal to the motor servo 27 which supplies a signal to the motor 26 to control the rotation of the motor 26.

The record operation is now described. The record operation is essentially identical to the reproducing operation but the laser 8 emits a higher intensity light beam than that in the reproducing operation. The light beam is focused on the optical card 1 and the information is recorded on the optical card in accordance with the modulation of the laser beam. Again, the conventional auto-focusing servo and auto-tracking servo may be applied to the record operation.

Figure 4:
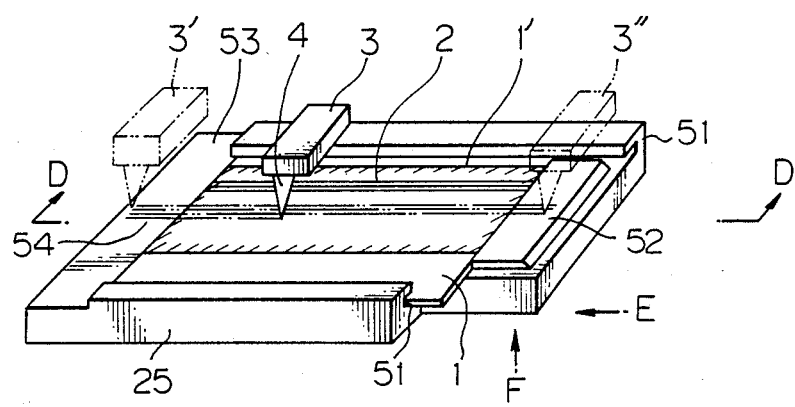
FIGS. 4, 5 and 6 show an optical card mount in the apparatus of the present invention.
Figure 5:
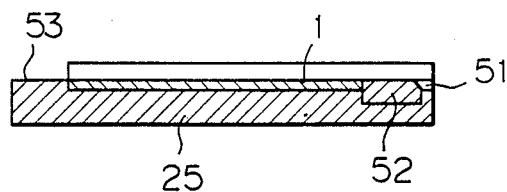

FIGS. 4 and 5 show one embodiment of the optical card mount 25 in the apparatus of FIG. 3. FIG. 4 shows a perspective view of the mount, and FIG. 5 is a D—D sectional view thereof. Numerals 3, 3' and 3" denote optical heads relatively moved to the optical card. Numerals 3' and 3" denote the optical heads positioned externally of the record area 1', and numeral 3 denotes the optical head positioned within the record area 1'. Grooves 51 are formed in the mount 25. The optical card 1 is inserted in a direction E while the opposite edges of the optical card 1 are held in the grooves 51. Numeral 52 denotes a member which is collapsed when it is pushed down. It is biased upward. One end of the member 52 is tapered. When the optical card 1 is inserted and moved along the taper in the direction E, it pushes the member 52 down to collapse it. When the optical card 1 is inserted to a predetermined position, the member 52 is projected by the biasing force and the level of the surface of the member 52 reaches substantially the same level as the record surface of the optical card 1. Numeral 53 denotes a stopper which defines a position of one end of the optical card 1 when it is inserted. The surface of the stopper 53 is also at the same level as the surface of the optical card 1. Because the surfaces of the stopper 53 and the member 52 are at the same level as the record plane (surface) of the inserted optical card 1, the auto-focusing is smoothly attained when the light beam passes through clearances between the optical card 1 and the members 52 and 53. Thus, even if the light beam moves from the record area 1' to the hold members 52 and 53, the light beam can continue the auto-focusing on the hold members.

Referring to FIGS. 4 and 5, a characteristic of the operation of the present apparatus is further expained. As shown in FIG. 4, a locus 54 of the light beam in the record and reproducing operations is from the optical card 1 to the members 52 and 53. While the optical head is externally of the optical card 1 (sections 3' and 3"), the motor 26 is started up and stopped down, and while the light beam is scanning at least the record area 1' of the optical card 1, the motor 26 is driven at the constant speed. Thus, when the light beam is irradiated onto the record area of the optical card 1, the optical card is always moved at the constant speed and the full record area can be effectively utilized.

In the present embodiment, when the light beam is outside of the optical card 1, the auto-tracking is locked. As the light beam moves on the optical card 1, and passes the optical card 1, the direction of the movement is reversed and again comes onto the optical card 1, the auto-tracking servo is again started. In this case, the light beam is not necessarily on the predetermined track. An auxiliary track having track numbers recorded thereon is formed along the track on the optical card 1 outside of the record area. By reading the track numbers, the light beam is moved transversely to the track (kicking) so that the light beam is directed onto the predetermined track.

In the embodiment shown in FIGS. 4 and 5, reflection coefficients of the surfaces of the hold members 52 and 53 are selected to be essentially the same as that of the record plane of the optical card 1. Thus, the surfaces of the hold members have the same reflection coefficients as that of the record area which contains no information. Accordingly, whether the light beam is on the hold member or on the optical card 1, the absence of information is detected. A track having similar geometry and reflection cofficient to those of the auxiliary track formed on the optical card 1 is formed on the hold member. Thus, the light beam can be kicked to a vicinity of the predetermined track by the auxiliary track formed on the surface of the hold member. When the direction of movement of the light beam is reversed and the light beam again comes onto the optical card 1, the light beam can reach the predetermined track by kicking one or two tracks at most. Thus, the kicking is simplified.

Figure 6:
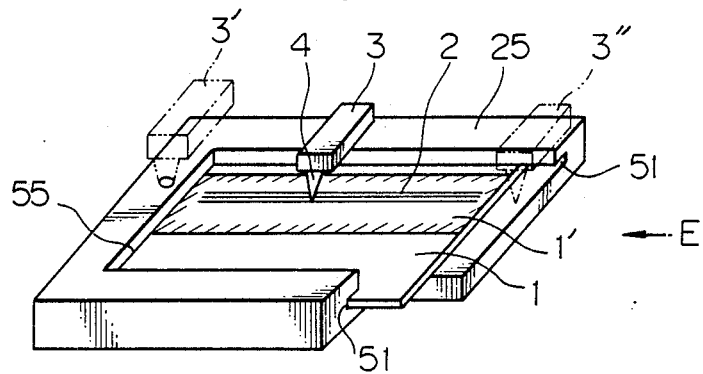

FIG. 6 shows another embodiment of the optical card mount of the present apparatus. The like reference numerals to those shown in FIG. 4 are used and the explanation thereof is omitted. In FIG. 6, numeral 55 denotes a wall of the optical card mount. The optical card inserted along the grooves 51 is stopped as the end thereof abuts against the wall 55. Tho operation of the present embodiment is similar to that of FIGS. 4 and 5. The optical head 3 is relatively moved to the external sections (3' and 3") of the optical card 1. When the light beam 4 irradiates the external section of the optical card 1, the auto-focusing is locked. The auto-tracking is attained in the same manner as the embodiment of FIGS. 4 and 5. Since the record plane of the optical card 1 is not at the same level as the surface of the hold member, the auto-focusing is locked to prevent heavy duty of the auto-focusing.

In the embodiment of FIG. 6, the reflection coefficient of the area irradiated by the light beam when the light beam is outside of the optical card 1 may be selected to be substantially zero. In this case, the auto-focusing need not the locked when the light beam is outside of the optical card 1. As shown in FIG. 6, when the light beam is outside of the optical card 1, the distance between the member (hold member) and the optical head is different from the distance between the optical head and the optical card 1, but the optical head is not moved because no reflection light is emitted. Thus, the auto-focus servo is not activated. In this case, the auto-focusing need not be locked and the sequence is simplified.

In the above embodiment, the reversal section includes the external area of the optical card 1, that is, the area of the optical card 1 in which the hold members are arranged. As seen from the above description, when the optical head is used, the auto-focusing servo and auto-tracking servo are difficult to attain when the optical head is out of the optical card in the reversal operation. It is therefore desirable that the optical head always irradiates the optical card 1 during all operations including the reversal operation. The width of the optical card 1, that is, the length thereof in the direction of track is longer than the length of the record area because the track numbers to identify the tracks are recorded on the opposite sides of the tracks, that is, outside of the record area or the area outside of the record area is used to smooth the movement of the light spot between the adjacent tracks on the optical card. In this manner, the reversal operation is carried out in the area outside of the record area of the optical card 1 so that the light beam from the optical head is prevented from moving out of the surface of the optical card and the auto-focusing and auto-tracking operations are maintained.

Figure 7:
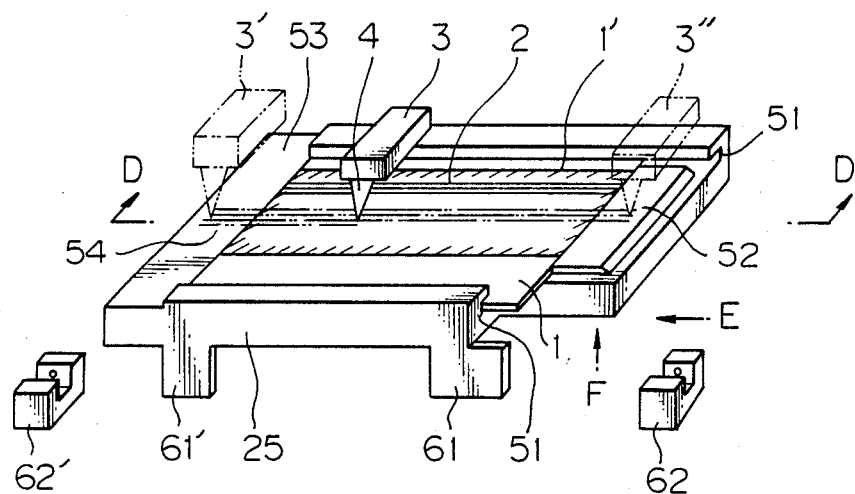
FIGS. 7, 8 and 9 show illustrate control to the relative speed between the optical head and the optical card.

The control of the speed of the optical head or the mount by the optical card mount is now explained. FIG. 7 illustrates the speed control of the optical card mount shown in FIG. 4. The like numerals to those shown in FIG. 4 designate the like elements and the explanation thereof is omitted here. Numerals 61 and 61' denote projections formed on the mount 25, and numerals 62 and 62' denote sensors. When the mount 25 is moved in the direction A, the projections 61 and 61' interrupt the sensors 62 and 62'. The sensors are positioned such that they generate signals when the optical head reaches the end of the record area. As the mount 25 is moved to the right in FIG. 7 so that the projection 61 interrupts the sensor 62, the sensor 62 generates a signal, which is supplied to the servo motor 27 which controls the motor 26 to move the mount 25. In response to the signal from the motor servo 27, the motor 26 starts deceleration a predetermined time later, and after it has been stopped, it is accelerated in the reverse direction. When the motor 26 reaches the predetermined speed by the acceleration, the acceleration is stopped and the motor is rotated at the constant speed. When the projection 61' reaches the sensor 62', a similar operation is repeated so that the mount is reciprocally moved. The area in which the speed of the mount is accelerated to the constant speed is outside of the record area of the optical card.

Figure 9:
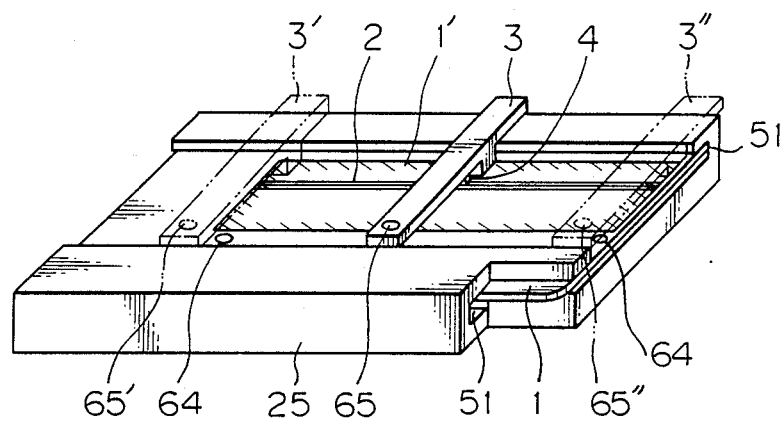

FIG. 9 shows another embodiment for controlling the speed of the optical card or optical head. The like elements to those shown in FIG. 7 are designated by the like numerals and the explanation thereof is omitted here. In the apparatus shown in FIG. 9, a reflection type sensor 65 is attached to an extended end of the optical head 3. A reflection surface 64 which reflects the light beam is formed at an end of the optical card 1. When the sensor 65 comes over the reflection surface 64, the sensor 65 generates a signal. The sensor 65 detects that the optical head has reached the predetermined position on the optical card 1 and decelerates the speed of the motor 26 as does in the apparatus of FIG. 7.

Figure 8:
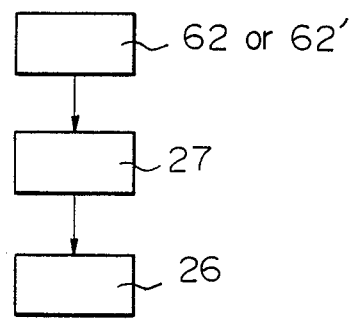

In the apparatus shown in FIG. 8, various lengths of cards may be attached. Since the reflection surface 64 is formed at the end of the optical card, the record area can be always scanned at the constant speed irrespective of the length of the optical card.

The speed control of the optical card mount has been described in the above embodiment, although the speed of the optical head may be controlled.

Figure 10:
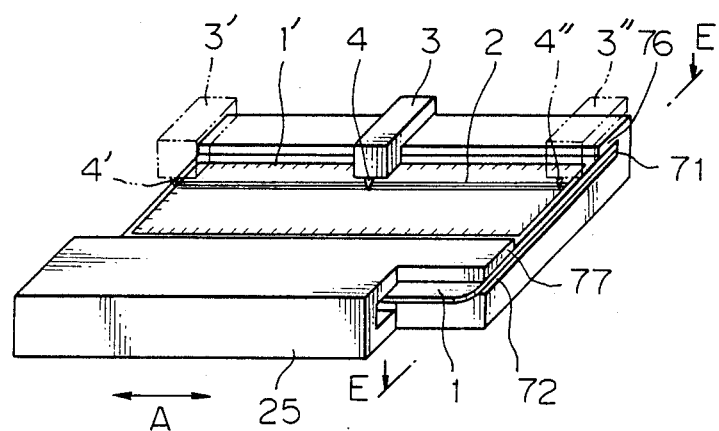
FIGS. 10, 11 and 12 show other embodiments of the optical card mount in the apparatus of the present invention.
Figure 11:
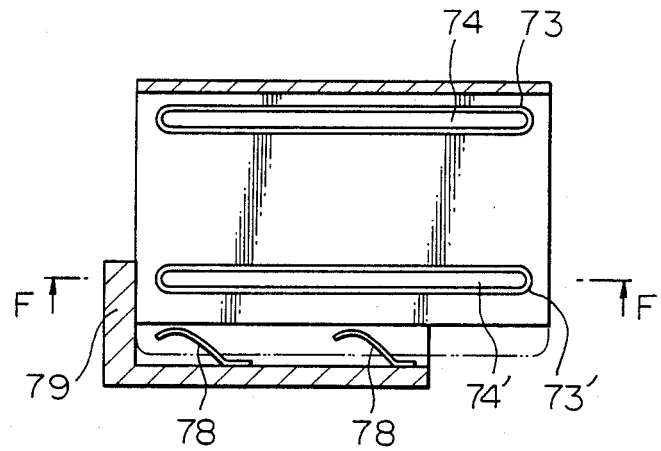
Figure 12:
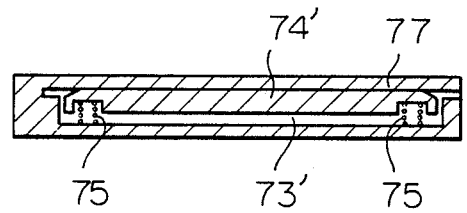

When the recording and reproduction are to be done in the area other than the rise-up and fall-down areas, it is desirable that the length of each track on which the information is recorded or from which the information is reproduced by the relative movement between the optical head and the record medium is long. Since a certain waste time (rise up and fall-down time) is necessary for each scan, the number of times of reciprocal movements in a unit time must be large in order to record or reproduce a given amount of information in a given time if the length of track is short. This means that a high power drive motor is required. The longer track is advantageous for error correction of the information. In the card hold means which achieves the above object, it is desirable to provide a mount which holds only the edge of the optical card which is parallel to the track. When the edge transverse to the track is held, the length along the track of the area outside of the record area is reduced. If a necessary length is allotted to the area outside of the record area, the length of the record area is reduced. The card mounts shown in FIGS. 4 and 6 are excellent in this aspect. FIGS. 10 to 12 show other embodiments of the card mount which satisfies the above requirement. In FIGS. 10 to 12, the card mount 25 has grooves 71 and 72 formed therein, and the opposite edges of the optical card parallel to an information track 72 are inserted into the grooves 71 and 72. The areas inserted into the grooves 71 and 72 are those other than the record area 1'. The card mount 25 also has recesses 73 and 74'. Card retention members 74 and 74' are vertically movably accommodated in the recesses 73 and 73'. When the card is not yet inserted, the card retention members 74 and 74' are urged to portions 76 and 77 of the card mount 25 by springs 75. When the card is inserted, the card retention members 74 and 74' are collapsed by the thickness of the card and urge the card from its back side so that the card surface is urged to the lower sides of the portions 76 and 77 of the card mount 25. In this manner, the optical card is held only by the card retention members 74 and 74' and the portions 76 and 77 of the card mount.

Accordingly, the edges of the optical card 1 transverse to the information track 72 are not fixed. Numeral 78 denotes leaf springs which urge the optical card 1 upward in the drawing of FIG. 11 when the optical card 1 is inserted to fix the card at the set position. Numeral 79 denotes a portion of the card mount which serves as a stopper to the card when the card is inserted.

Figures 13A, 13B:
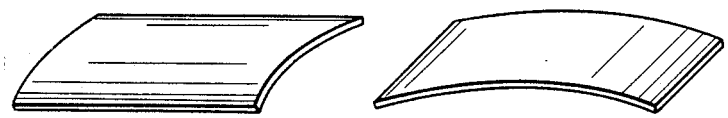
FIGS. 13(a) and 13(b) illustrate warp of the optical card.

As shown in FIGS. 13(a) and 13(b), the card usually has longitudinal or lateral warp, or a combination thereof. When such a warped card is inserted into the card mount shown in FIGS. 4–6 or 10–12, the longitudinal warp shown in FIG. 13(b) is essentially eliminated. The warp shown in FIG. 13(a) remains although it is much reduced. When the optical head 3 is relatively scanned to the card 1 in the direction A, that is, along the information track, the relative speed in the direction A is very high and the object lens of the optical head 13 must be moved along the optical axis at a high speed by the auto-focusing servo. Since the warp of the card in the direction A is essentially zero, the auto-focusing can fully follow. The relative speed of the optical head to the optical card in the direction B transverse to the direction A is slower than that in the direction A. Therefore, the auto-focusing can fully follow even if the card includes a certain warp in the direction B.

In accordance with the present invention, the rise-up and fall-down sections of the relative speed between the optical head and the optical card are outside of the record area of the optical card, and the relative speed between the optical head and the optical card in the record area is constant so that the record area can be effectively utilized. Since the rise-up time and fall-down time may be long, the torque of the drive means for the optical head or the optical card may be small.

We claim:

1. An optical information recording apparatus comprising:

an optical head for recording information on a card-shaped optical recording medium, said head including an object lens for converging a light beam onto the recording medium, means for controlling the amount of irradiation on the recording medium in accordance with the information to be written and focusing means for controlling the objective lens so as to keep a distance between the recording medium and the objective lens constant;

first means for reciprocally moving the optical head relatively to the recording medium;

second means for moving the optical head relative to the recording medium transversely to a direction of the relative movement by said first means; and control means for controlling a relative speed of the relative movement between the recording medium and the optical head by said first means, said control means keeping the relative speed constant in a record area of the recording medium in which the information is to be recorded and changing the relative speed, outside of the record area, to reverse the direction of the relative movement between the recording medium and the optical read by said first means outside of the record area.

2. A recording apparatus according to claim 1, wherein said control means includes means for detecting a positional relation between the record area of the recording medium and the optical head and said control means starts a reversed operation for reversing the direction of the relative movement by said first means in accordance with a signal from said detecting means.

3. A recording apparatus according to claim 1, wherein said focusing means is in action outside of the record area as well.

4. A recording apparatus according to claim 1, wherein the light beam from the optical head lies in the recording medium during said reversal operation.

5. A recording apparatus according to claim 2, wherein the light beam from the optical head falls without the recording medium during said reversal operation.

6. A recording apparatus according to claim 1, further comprising a member for supporting an end of the recording medium extending in a direction normal to the direction of the relative movement by said first means, and wherein a surface level of said member is equal to that of the recording medium.

7. A recording apparatus according to claim 1, further comprising a member for supporting an end of the recording medium extending in a direction normal to the direction of the relative movement by said first means, and wherein the reflection coefficient of a surface of said member is substantially equal to that of the recording medium.

8. A recording apparatus according to claim 1, wherein said focusing means of the optical head is locked outside of the record area.

9. A recording apparatus according to claim 1, further comprising auto-tracking means for causing the light beam from the optical head to be applied to a correct position of the recording medium.

10. An optical information reproducing apparatus comprising:

an optical head for reproducing information from a card-shaped optical recording medium, said head including an objective lens for converging a light beam onto an information track or the recording medium, means for receiving a light beam from the recording medium and focusing means for controlling the objective lens so as to keep a distance between the recording medium and the objective lens constant;

first means for reciprocally moving the optical head relative to the recording medium along the information track;

second means for moving the optical head relative to the recording medium transversely to a direction of the relative movement by said first means; and control means for controlling a relative speed of the relative movement between the recording medium and the optical head by said first means, said control means keeping the relative speed constant in an area of the recording medium in which the information is to be read and changing the relative speed, outside of the area, to reverse the direction of the relative movement between the recording medium and the optical head by said first means outside of the area.

11. A reproducing apparatus according to claim 10, wherein said control means includes means for detecting a positional relation between the area of the recording medium and the optical head and said control means starts a reversal operation for reversing the direction of the relative movement by said first means in accordance with a signal from said detecting means.

12. A recording apparatus according to claim 10, wherein said focusing means is in action outside of the area of the recording medium as well.

13. A recording apparatus according to claim 10, wherein the light beam from the optical head lies in the recording medium during said reversal operation.

14. A recording apparatus according to claim 11, wherein the light beam from the optical head falls without the recording medium during said reversal operation.

15. A recording apparatus according to claim 10, further comprising a member for supporting an end of the recording medium extending in a direction normal to the direction of the relative movement by said first means, and wherein a surface level of said member is equal to that of the recording medium.

16. A recording apparatus according to claim 10, further comprising a member for supporting an end of the recording medium extending in a direction normal to the direction of the relative movement by said first means, and wherein the reflection coefficient of a surface of said member is substantially equal to that of the recording medium.

17. A recording apparatus according to claim 10, wherein said focusing means of the optical head is locked outside of the area of the recording medium.

18. A recording apparatus according to claim 10, further comprising auto-tracking means for causing the light beam from the optical head to be applied to a correct position of the recording medium.

19. An optical information recording and reproducing apparatus comprising:

an optical head for recording and reproducing information on or from a card-shaped optical recording medium, said head including an objective lens for converging a light beam onto the recording medium, means for controlling the amount of irradiation on the recording medium in accordance with the information to be written, means for receiving a light beam from the recording medium and focusing means for controlling the objective lens so as to keep a distance between the recording medium and the objective lens constant;

first means for reciprocally moving the optical head relative to the recording medium;

second means for moving the optical head relative to the recording medium transversely to a direction of the relative movement by said first means; and control means for controlling a relative speed of the relative movement between the recording medium and the optical head by said first means, said control means keeping the relative speed constant in an area of the recording medium in which the information recording and reproduction are to be effected and changing the relative speed, outside of the area, to reverse the direction of the relative movement between the recording medium and the optical head by said first means outside of the area.

20. A recording apparatus according to claim 19, wherein said control means includes means for detecting a positional relation between the area of the recording medium and the optical head and said control means starts a reversal operation for reversing the direction of the relative movement by said first means in accordance with a signal from said detecting means.

21. A recording apparatus according to claim 19, wherein said focusing means is in action outside of the area of the recording medium as well.

22. A recording apparatus according to claim 19, wherein the light beam from the optical head lies in the recording medium during said reversal operation.

23. A recording apparatus according to claim 9, wherein the light beam from the optical head falls without the recording medium during said reversal operation.

24. A recording apparatus according to claim 8, further comprising a member for supporting an end of the recording medium extending in a direction normal to the direction of the relative movement by said first means, and wherein a surface level of said member is equal to that of the recording medium.

25. A recording apparatus according to claim 8, further comprising a member for supporting an end of the recording medium extending in a direction normal to the direction of the relative movement by said first means and wherein the reflection coefficient of a surface of said member is substantially equal to that of the recording medium.

26. A recording apparatus according to claim 8, wherein said focusing means of the optical head is locked outside of the area of the recording medium.

27. A recording apparatus according to claim 8, further comprising auto-tracking means for causing the light beam from the optical head to be applied to a correct position of the recording medium.

28. An optical information recording or reproducing apparatus comprising:

a mount on which a card-shaped optical recording medium is to be mounted, said mount including means for holding only an edge of the recording medium parallel to a direction of an information track extension of the recording medium so as to eliminate a warp of the recording medium in the direction of the information track extension;

an optical head for effecting at least one of information recording and reproduction on or from the recording medium, said optical head including means for applying a light beam to the recording medium and means for receiving a light beam from the recording medium;

first means for reciprocally moving the optical head relative to the mount;

second means for moving the optical head relative to the mount transversely to a direction of the relative movement by said first means; and control means for controlling a relative speed of the relative movement between the mount and the optical head by said first means, said control means keeping the relative speed constant in an area of the recording medium in which at least one of the information recording and reproduction is effected and changing the relative speed, outside of the area, to reverse the direction of the relative movement between the mount and the optical head by said first means outside of the area.

29. An optical information recording and/or reproducing apparatus comprising:

an optical head for recording and/or reproducing information on or from a card-shaped optical recording medium, said optical head including means for applying a light beam on an information track of the recording medium, means for receiving a light beam from the recording medium and focusing means for controlling an objective lens in the optical head to keep a distance between the recording medium and the objective lens constant;

first means for reciprocally moving the optical head relative to the recording medium in a direction parallel to the information track;

second means for moving the optical head relative to the recording medium transversely to the information track;

control means for controlling a relative speed of the relative movement between the recording medium and the optical head by said first means, said control means keeping the relative speed constant in a record area of the recording medium, and outside of the record area, gradually reducing the relative speed between the recording medium and the optical head, reversing the direction of the relative movement when the relative speed has reached zero and then gradually increasing the relative speed between the recording medium and the optical head to reverse the direction of the relative movement between the recording medium and the optical head.

* * * * *

UNITED STATES PATENT AND TRADEMARK OFFICE
CERTIFICATE OF CORRECTION

PATENT NO. : 4,922,351

DATED : May 1, 1990

INVENTOR(S) : Kenichi Suzuki et al.

Page 1 of 3

It is certified that error appears in the above-identified patent and that said Letters Patent is hereby corrected as shown below:

Title Page:
[21] Appl. No.:
   "213,516" should read --213,515--.

Title Page:
[30] Foreign Application Priority Data:
   "Dec. 31, 1984 [JP]   Japan ...... 59-28144"
           should read
   --Dec. 31, 1984 [JP]   Japan ...... 59-281441--.

COLUMN 1:

Line 5, "division," should read --continuation,--.

COLUMN 3:

Line 25, change "planer" to --plane--.

Line 28, "reeves" should read --reeved--.

Line 53, delete "4".

COLUMN 4:

Line 18, "cf" should read --of--.

Line 49, "expained." should read --explained.--.

UNITED STATES PATENT AND TRADEMARK OFFICE
CERTIFICATE OF CORRECTION

PATENT NO. : 4,922,351

DATED : May 1, 1990

INVENTOR(S) : Kenichi Suzuki et al.

It is certified that error appears in the above-identified patent and that said Letters Patent is hereby corrected as shown below:

COLUMN 5:

Line 31, "Tho" should read --The--.

Line 35, delete "4".

COLUMN 6:

Line 24, "servo motor 27" should read --motor servo 27--.

COLUMN 7:

Line 47, "optical head 13" should read --optical head 3--.

COLUMN 8:

Line 3, change "object lens" to --objective lens--.

Line 23, "optical read" should read --optical head--.

Line 67, "or" should read --on--.

COLUMN 10:

Line 31, "claim 9," should read --claim 20,--.

UNITED STATES PATENT AND TRADEMARK OFFICE
CERTIFICATE OF CORRECTION

PATENT NO. : 4,922,351

DATED : May 1, 1990

INVENTOR(S) : Kenichi Suzuki et al.

It is certified that error appears in the above-identified patent and that said Letters Patent is hereby corrected as shown below:

Line 35, "claim 8," should read --claim 19,--.

Line 41, "claim 8," should read --claim 19,--.

Line 46, "means and" should read --means, and--.

Line 49, "claim 8," should read --claim 19,--.

Line 52, "claim 8," should read --claim 19,--.

COLUMN 12:

Line 9, "track;" should read --track; and--.

Signed and Sealed this

Ninth Day of June, 1992

Attest:

DOUGLAS B. COMER

*Attesting Officer*   *Acting Commissioner of Patents and Trademarks*